United States Patent [19]

Cole

[11] Patent Number: 6,097,009
[45] Date of Patent: Aug. 1, 2000

[54] HEATING APPARATUS AND CIRCUIT CONTROL

[75] Inventor: Graham Malcolm Cole, Lymington, United Kingdom

[73] Assignee: Imetec SpA, Bergamo, Italy

[21] Appl. No.: 09/173,723

[22] Filed: Oct. 16, 1998

[30] Foreign Application Priority Data

Oct. 17, 1997 [GB] United Kingdom .................... 9721957
Sep. 11, 1998 [GB] United Kingdom .................... 9819738

[51] Int. Cl.[7] ................................................... H05B 3/34
[52] U.S. Cl. ........................ 219/528; 219/483; 219/497; 219/212; 219/549; 219/517; 307/75
[58] Field of Search ................................... 219/528, 505, 219/497, 212, 501, 517, 482, 485, 486, 489, 492, 502, 543, 544, 549; 338/92, 254, 255, 262, 306, 314; 307/75

[56] References Cited

U.S. PATENT DOCUMENTS

| | | | |
|---|---|---|---|
| 1,752,944 | 4/1930 | Eitzen | 307/75 |
| 4,238,672 | 12/1980 | Siess | 219/502 |
| 4,400,614 | 8/1983 | Sopory | 219/528 |
| 4,491,723 | 1/1985 | Cole | 219/505 |
| 5,105,067 | 4/1992 | Brekkerstran et al. | 219/497 |
| 5,218,185 | 6/1993 | Gross | 219/528 |
| 5,403,992 | 4/1995 | Cole | 219/528 |

*Primary Examiner*—Teresa Walberg
*Assistant Examiner*—Leonid Fastovsky
*Attorney, Agent, or Firm*—Young & Thompson

[57] ABSTRACT

A heating assembly, for use as an electric blanket or personal heating pad, includes a flexible heating panel and an electric circuit for heating the panel. An electrical heating element is mounted directly on the panel and includes inner and outer coaxial coil conductors separated by an electrically insulating layer and surrounded by an outer electrically insulating layer. A two-core flexible electric cable connects the heating element to the power supply, and to an electric control switch for controlling operation of the heating element, a fuse being located in the circuit to be actuated in the event of a short circuit occurring between the conductors of the heating element, due to breakdown of the inner insulating layer. The electric circuit also includes a device for controlling the temperature of the heating element. The heating element is the only component of the electric circuit which is mounted directly on the flexible heating panel, and is connected to the rest of the circuit, including the control device, by the two-core flexible electric cable.

18 Claims, 4 Drawing Sheets

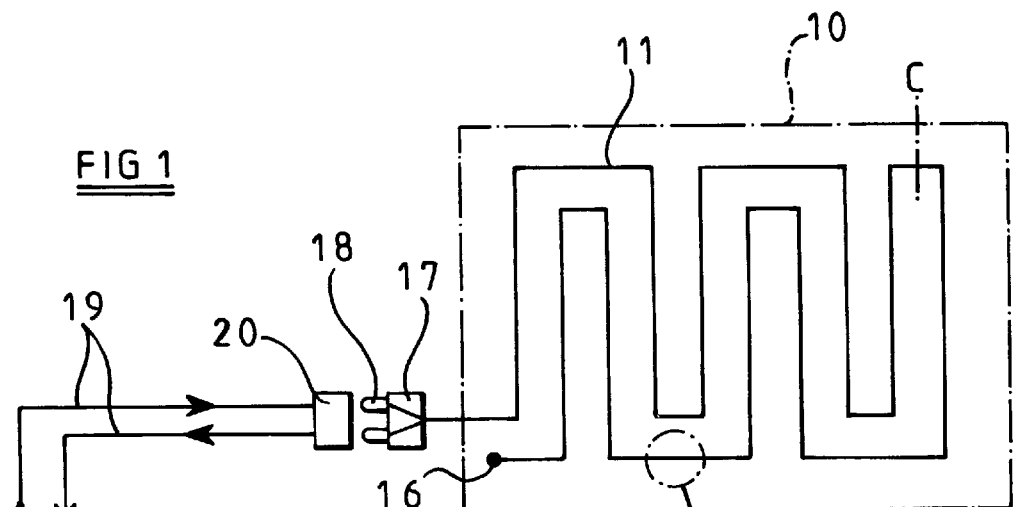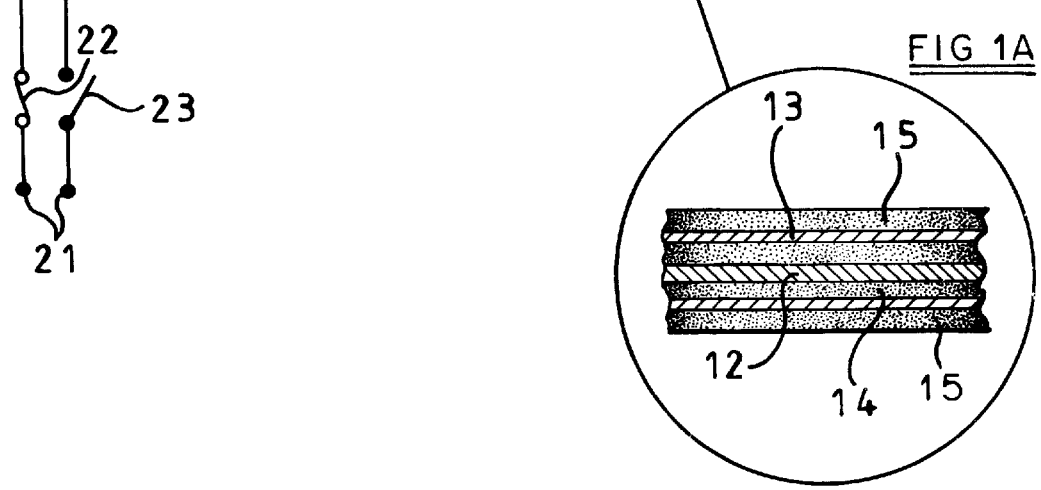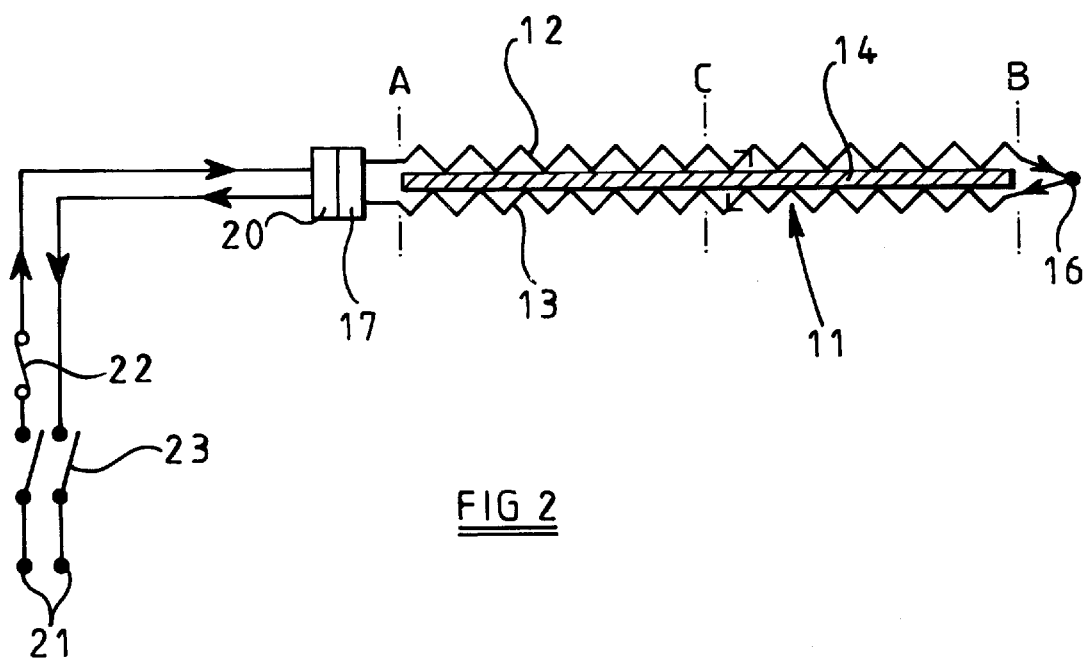

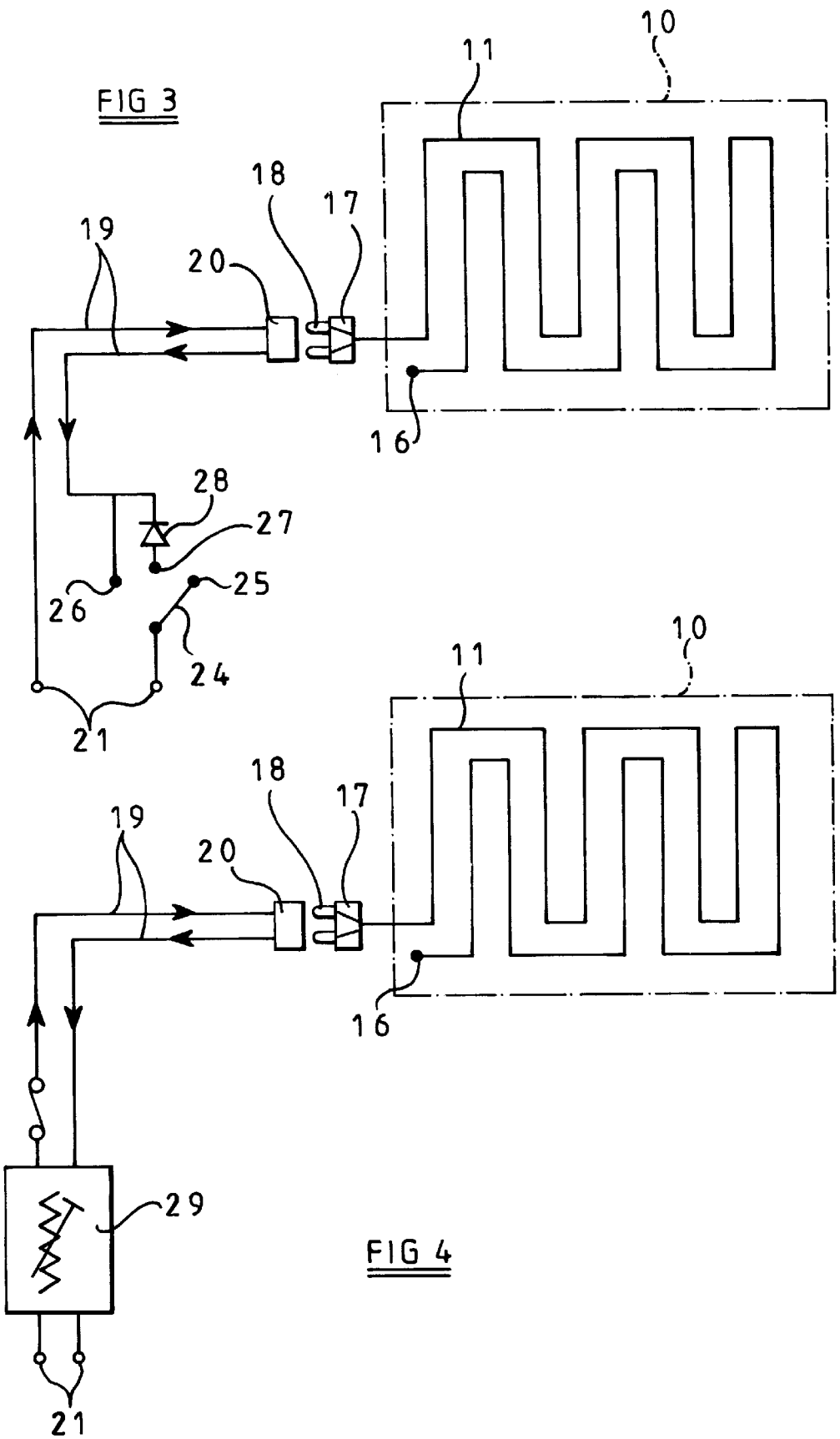

HEATING APPARATUS AND CIRCUIT CONTROL

BACKGROUND OF THE INVENTION

The invention relates to heating apparatus comprising a flexible heating panel and electrical components for heating the panel. The invention is particularly applicable to electric blankets for domestic use, and will be specifically described in relation thereto. However, it will be appreciated that the invention may also be applied to many other forms of heated panels, such as under-carpet heaters, mattresses and pads.

Electric blankets commonly include a heating element in the form of inner and outer concentric coil conductors separated by an electrically insulating layer. One or other, or both, of the coils provide the heating effect. Should overheating occur, the insulating layer separating the two conductors is designed to melt, causing the two conductors to come into electrical contact with one another, causing a short circuit or low impedance path to occur. This causes a surge of current in the electric circuit containing the conductors, causing a fuse to blow and thus isolating the blanket from the mains supply.

There are many ways of detecting that a short circuit or low impedance path has developed between the two conductors, and examples of suitable circuits are described in British Patent Specifications Nos. 1155118, 1585921, 1599709, 2028608, 2266201 and 2286935.

However, existing systems typically require the use of at least 1200V diodes in series/parallel with the conductors of the heating element. Such diodes are both costly and prone to failure because of semi-conductor transient problems. Transient variations in the mains supply can, of course, be nullified by the use of a VDR device to prevent mains voltage peaks up to a maximum of, say, 800V (which is typical for a device connected to a 255V AC supply). However this still does not prevent the diodes occasionally breaking down in use of the blanket due, it is believed, to severe transient oscillations in the distributed inductance/capacitance network formed by the two coaxial windings.

Also, in many of the existing arrangements the four ends of the coaxial conductors are connected to an in-line switch or a bedside control unit for adjusting the heat setting of the blanket. This requires a multi-core cable to be connected to the blanket and such cables are bulky and heavy and relatively stiff, particularly under cold conditions, and accordingly may be difficult to manipulate and stow away. Also, fires may be caused by arcing due to failure of the multi-core electrical flex leading to the blanket. It is therefore desirable for the design of the electric blanket to be such that only a simple two-core flexible electrical cable is required between the blanket and the mains supply or control unit.

The invention is also applicable to low cost heating pads of smaller size than conventional electric blankets. Such heating pads are typically 30 cm×40 cm in dimensions and are commonly used to provide low cost personal heating in domestic situations. For example such pads may be stood on, sat on or placed around the sides of armchairs. Such heating pads are required to be fairly flexible and to have a fast warm-up. Consequently they generally incorporate a large length of heating element at close pitching, at a power/unit area rating which is typically ten times that for a conventional electric underblanket.

In presently available heating pads of this type the heating element is a single conducting wire wrapped on a rayon core and covered with a pvc sleeve. The conductor is disposed in a tortuous arrangement on the pad at a close pitching of the order of 12–15 mm. In order to provide overheating protection, one or more close differential thermostats are connected in the heating element, on the pad, and are arranged to break the circuit automatically in the event of the temperature of the element exceeding a predetermined value. However, since such heat pads are often subjected to considerable rucking or folding in use, this can lead to overheating of the element in areas away from the thermostats, with the result that the pad may overheat.

The present invention sets out to provide an electrically heated blanket, personal heating pad, or similar heating assembly in which the above-mentioned problems may be overcome.

SUMMARY OF THE INVENTION

According to the invention there is provided a heating assembly comprising a flexible heating panel and electrical components providing an electric circuit for heating the panel, the electrical components including an electrical heating element mounted directly on the panel and comprising inner and outer coaxial coil conductors separated by an electrically insulating layer and surrounded by an outer electrically insulating layer, an electric cable for connecting the heating element to a power supply, an electric control switch for controlling operation of the heating element, and a fuse device located to be actuated in the event of a short circuit occurring between the conductors of the heating element resulting from breakdown of any part of said inner insulating layer, said heating element being the only component of said electric circuit which is mounted directly on the flexible heating panel, and said cable for connecting the heating element to a power supply comprising a flexible two-core electrical cable connecting the heating element to the other components of the electric circuit.

The electric circuit preferably includes a separable two-pin plug and socket connector located in the two-core flexible cable adjacent the heating panel.

The coaxial conductors of the heating element are preferably connected so that they carry the same current in opposite directions along the length of the element. For example, they may be connected together at one end, the opposite ends of the conductors being connected respectively to the conductors of the two-core electrical cable In one arrangement both ends of the heating element may be located adjacent one side edge of the heating panel, a portion of the heating element intermediate the ends thereof being located adjacent the opposite side edge of the heating panel. Stretches of the heating element along one half of the length thereof may lie generally alongside stretches of the element along the other half thereof. For example, the heating element may be mounted on the heating panel in a tortuous configuration, each stretch of the element which is nearer one end of the element lying alongside another stretch which is a similar distance from the opposite end of the element.

In the case where the assembly is a heating pad for personal use the distance between adjacent stretches of the heating element is preferably generally in the range of 12–15 mm.

In an alternative arrangement, a first minor stretch of the heating element, extending away from the end thereof which is connected to the two-core flexible cable, extends across a region of the heating panel adjacent connection of the element to the two-core cable, across a region of the panel furthest from the connection to the two-core cable, and across a region of the panel intermediate the first said two regions.

In any of the above arrangements according to the invention the electric circuit, when connected to an alternating current power supply, preferably allows full wave alternating current to flow through the heating element.

The electric circuit preferably includes control means to permit variation in the current flowing through the heating element. For example, the control means may include a rectifier diode and switch means selectable to bring the diode into and out of circuit with the heating element. Alternatively the control means may comprise a mechanical or electronic energy regulator.

The electric circuit may include means to sense the change of resistance of the heating element with change in temperature and to control the temperature of the element in response to the change in resistance to keep the temperature at a pre-set value. The means to sense the change of resistance of the heating element may comprise a current monitoring resistance connected to the heating element so that increase in temperature, and hence resistance of the heating element, results in a decrease in current flowing through the monitoring resistance, the circuit further including means to reduce the energy supplied to the heating element in response to a fall in the current flowing through the monitoring resistance, and to increase the energy supplied to the heating element in response to a rise in the current flowing through the monitoring resistance.

In such an arrangement the electric circuit may include further resistors connected across the power supply to provide a reference voltage so that the voltage across the monitoring resistance is equal to the reference voltage at a desired temperature of the heating element, means being provided to vary the reference voltage selectively, so as to vary the desired temperature. The means to vary the reference voltage may comprise means for selectively connecting one or more setting resistors in series with one of said resistors determining the reference voltage. The electric circuit may further include clock means for automatically connecting one of said setting resistors in series with said one of the reference voltage determining resistors for a predetermined period when the heating element is first connected to the power supply, in order to provide a rapid warm-up period.

In any of the arrangements according to the invention the inner insulating layer between the conductors may have a melting point which is 40–60° C. lower than the melting point of said outer insulating layer surrounding the outer conductor. The melting point may be in the range of about 135–145° C. The fuse device is preferably a slow blow fuse.

BRIEF DESCRIPTION OF THE DRAWINGS

FIG. 1 is a diagrammatic representation of an electric blanket in accordance with the invention, FIG. 1A is a diagrammatic enlarged longitudinal section through a portion of the heating element of the electric blanket of FIG. 1, FIG. 2 is a schematic view of the circuit incorporated in the electric blanket, FIGS. 3 and 4 show modifications of the circuit in order to provide alternative heat settings for the blanket.

DETAILED DESCRIPTION OF THE PREFERRED EMBODIMENTS

Figure 5:
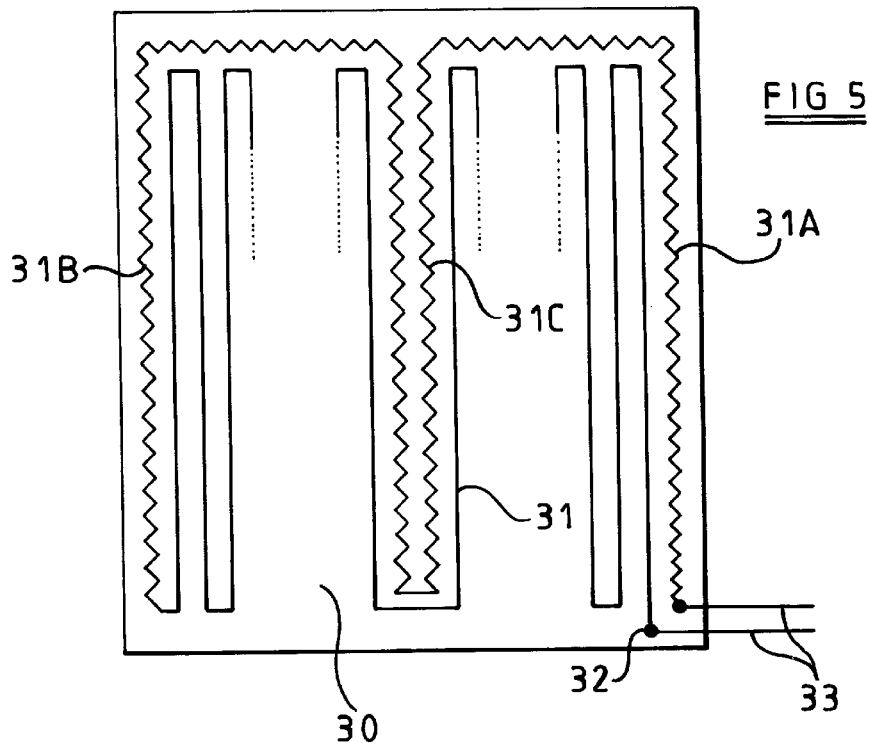
FIG. 5 is a similar view to FIG. 1 of one form of personal heating pad according to the present invention.

Referring to FIG. 1: there is mounted on the blanket 10 a heating element 11 comprising an inner conductor 12 separated from a coaxial outer conductor 13 by an inner insulating layer 14, the coaxial conductors being surrounded by an outer insulating layer 15. The heating element 11 is mounted on the blanket 10 in a tortuous or convoluted pattern, as shown diagrammatically, so as to extend over substantially the whole area of the blanket, in well known manner. The construction and materials of the blanket itself, the pattern in which the heating element is arranged, and the manner in which it is secured to the blanket, do not form a part of the present invention and will not therefore be described in detail. Those skilled in the art will be well aware of the alternative forms of construction which are available.

At one end, 16, of the heating element the two conductors 12 and 13 are electrically connected together and externally insulated. At the other end of the element 11 the conductors are connected to a two-pin plug 17, the conductors 12 and 13 being connected respectively to the two pins 18 of the plug. A flexible two-core electric cable 19 extends from a socket 20 which is connectable to the plug 17, the cable leading to a 240V AC mains supply 21. A fuse 22 and switch 23 are provided in the cable 19 or in a control unit associated therewith.

The inner insulating layer 14 has a very much lower melting point than the outer insulating layer 15, typically 40°–60° C. lower. The inner conductor 12 is of very low resistance and may be of tinsel copper format, or similar copper wrap. The outer conductor 13 is made of a suitable alloy, as is well known in the art, so as to provide the required heating effect. The two conductors 12, 13 may be concentrically wound coils.

In its simplest form the control of the electric blanket may, as shown in FIG. 1, comprise a series fuse 22 and a simple on/off switch indicated diagrammatically at 23. The on/off switch may be incorporated in a control block which also incorporates the fuse 22.

The fuse 22 is a slow blow type which is-guaranteed to blow at, for example, 1.5× rated current. Such a fuse has been developed for use in telecommunication applications, and unlike quick blow types, as conventionally used in electric blankets, which generally blow within fractions of a second when current exceeds 2.1 rated value, these slow blow fuses are much slower in operation and are less affected by transient surges in current. However, standard quick blow fuses might also be used.

FIG. 2 shows diagrammatically the manner in which the blanket of FIG. 1 operates should overheating occur. For the purposes of explanation the conductors 12 and 13, and the inner insulating layer 14, are shown diagrammatically as extending along a straight line. As described above, at one end the conductors are connected through a plug and socket 17, 20 and two-core cable 19 to the mains supply 21, and at the opposite end 16 are electrically connected together.

If overheating occurs at any location along the heating element 11 the inner insulating layer 14 will melt allowing the inner and outer conductors to come into contact with one another, causing a short circuit at the location where overheating has occurred. Alternatively, the conductors might short circuit due to breakdown of the insulating layer through mistreatment or damage to the blanket.

The current flowing through a short circuit varies from infinity if the short circuit occurs at "A" adjacent the plug/socket 17, 20 to a value I at position "B" adjacent the end 16 of the element. At an intermediate position "C" halfway along the length of the element the short circuit current is 2×I. The rise in current resulting from the short circuit will cause the fuse 22 to blow, thus disconnecting the heating element from the mains supply.

However, advantage is provided by arranging the element 11 in a tortuous configuration, as shown in FIG. 1, so that the end 16 of the element is spatially adjacent the plug/socket 17, 20. In this case the element is, in effect, folded so that one half of the element lies alongside the other half. With this arrangement if a short circuit occurs as a result of excessive rucking or folding of the blanket, causing damage to the element and breakdown of the inner insulating layer, the minimum current change as a result of such breakdown will be 2×I when the breakdown occurs at the right hand side of the blanket, furthest from the plug/socket 17, 20, corresponding to position C in FIGS. 1 and 2. At locations nearer the left hand side of the blanket the current change will be greater, assuming that both portions of the element will be damaged at such location.

In practice, if a short circuit should occur within the right hand side of the blanket, the doubling of current will cause increased power dissipation within the portion of the element still conducting. This in turn will lead to more multiple short circuits as the inner insulating layer 14 melts. Such a condition results in the current through the fuse 22 increasing significantly above the value of 2×I. Since the inner insulating layer melts at a temperature well below the melting temperature of the outer insulating layer, this progressive melting and shorting together of the coaxial coils before the fuse blows presents no hazard whatsoever as the inner insulating layer melt temperature is significantly below even the scorch temperature of the fabric envelope of the blanket.

The system described therefore provides for simple, low cost overheat protected blanket, requiring only a fuse and no semiconductor devices whatsoever in its basic form. Also, since the conductors 12, 13 are arranged so that current flows through them in opposite directions, as may be seen from FIG. 2, any electro-magnetic fields resulting from the electric current flowing through the heating element are minimised. As is well known, it is believed that such electromagnetic fields may have an adverse effect on the human body.

If required, the control means for the blanket may provide for alternative heat setting, and arrangements are shown diagrammatically, by way of example, in FIGS. 3 and 4.

In the arrangement of FIG. 3 the switch 24 may be switched from an off position 25 to a full heat position 26 which directly connects the heating element 11 to the mains supply 21, or to an intermediate position 27 where a rectifier diode 28 is brought into circuit so that current flows through the element only in the positive half cycles of the mains supply, thereby providing a 50% heat setting.

In the arrangement of FIG. 4 the control is effected by a mechanical or electronic voltage regulator indicated diagrammatically at 29. Available types of regulator will be well known to those skilled in the art and will not therefore be described in detail.

The system according to the present invention has the advantage that the heating element may, if required, present a full wave resistive load to the supply, unlike many of the existing protection systems which use series rectifier diodes on all heat setting and thereby give rise to DC components on the mains supply lines.

Such DC components can cause severe problems in many distribution systems and indeed, are limited by legislation to very low values in many countries.

If the system according to the invention is used with a simple switch or bi-metallic regulator one has a very low cost, but fully protected, single/multi-heat blanket suitable for use in 110V systems (where use of series diodes can cause heat dissipation problems as well), and 230V systems as used in Australia and New Zealand.

Furthermore, because there are no diodes or similar components mounted on the blanket itself, the terminations of the ends of the element can be made much more quickly, using techniques which are well known and practised by blanket manufacturers.

FIG. 5 shows a personal heating pad in accordance with the present invention. In the case of an electric blanket, whether an overblanket or an underblanket, the blanket is intended to be used on a single or double bed and is of corresponding size. By contrast, a heating pad for personal use is intended to provide localised heating to part of the body, for example in a chair or under the feet, and consequently the pad is of comparatively small size, being typically 40 cm×30 cm.

Referring to FIG. 5: there is mounted on the pad 30 a heating element 31 which, as in the arrangement of FIGS. 1–4, comprises an inner conductor separated from a coaxial outer conductor by an inner insulating layer, the coaxial conductors being surrounded by an outer insulating layer.

As in the previous arrangements, the heating element 31 may be mounted on the pad 30 in a tortuous or convoluted pattern, as shown diagrammatically, so as to extend over substantially the whole area of the pad. However, this is not essential, and other configurations of the heating element are possible. For example, the arrangement of the heating element may be of the kind shown in FIGS. 1, 3 or 4. In order to provide rapid warm-up of the pad, however, the adjacent stretches of the heating element of the heating pad are arranged at a much closer pitch than the element of an electric blanket and typically the distance between adjacent stretches may be 12 mm–15 mm.

At one end 32 of the heating element the two conductors are electrically connected together and externally insulated. At the other end of the element the co-axial conductors are connected by a two-core electric cable 33 via a two-pin plug (not shown) to a 240V AC mains supply, a fuse and control switch assembly being provided in the cable, as will be described.

In the particular arrangement shown by way of example in FIG. 5, the portion of the heating element 31 which is nearest to the two-core cable 33 is a part of the element where a short circuit, caused by overheating of the pad, will give a very high current to operate the fuse. This portion of the heating element comprises two stretches 31A and 31B of the element, which extend around the periphery of the pad 30, and an intermediate portion 31C which extends across a central part of the pad. The remainder of the element 31 extends in a tortuous configuration from the end of the portion 31B to the point 32.

Since the heating pad may be desired to operate at a higher temperature than an electric blanket, the insulation between the inner and outer conductors of the heating element 31 is a higher melt polythene having a melting temperature in the region of about 135° C. to 145° C. As in the previously described arrangements, the inner conductor of the heating element will be of low resistance alloy or of tinsel copper construction. The outer conductor will be of high temperature coefficient, high resistance alloy, wound to a tight resistance tolerance.

As previously mentioned, personal heating pads typically operate at about ten times the power/unit area rating of an electric underblanket. Because of this they can warm up very quickly, so some form of automatic temperature control is desirable to prevent the heating element failing and causing a short circuit during "normal" use and under mild abuse. Also, if an abuse does occur in the relatively small pad, leading to a short circuit somewhere in the stretches of heating element, which are at very close pitching, the power dissipation in the remaining active portion of the element will increase even more than the normal high operating range. This will lead rapidly to other short circuit failures, and hence fuse failure, as input current increases rapidly.

Figure 6:
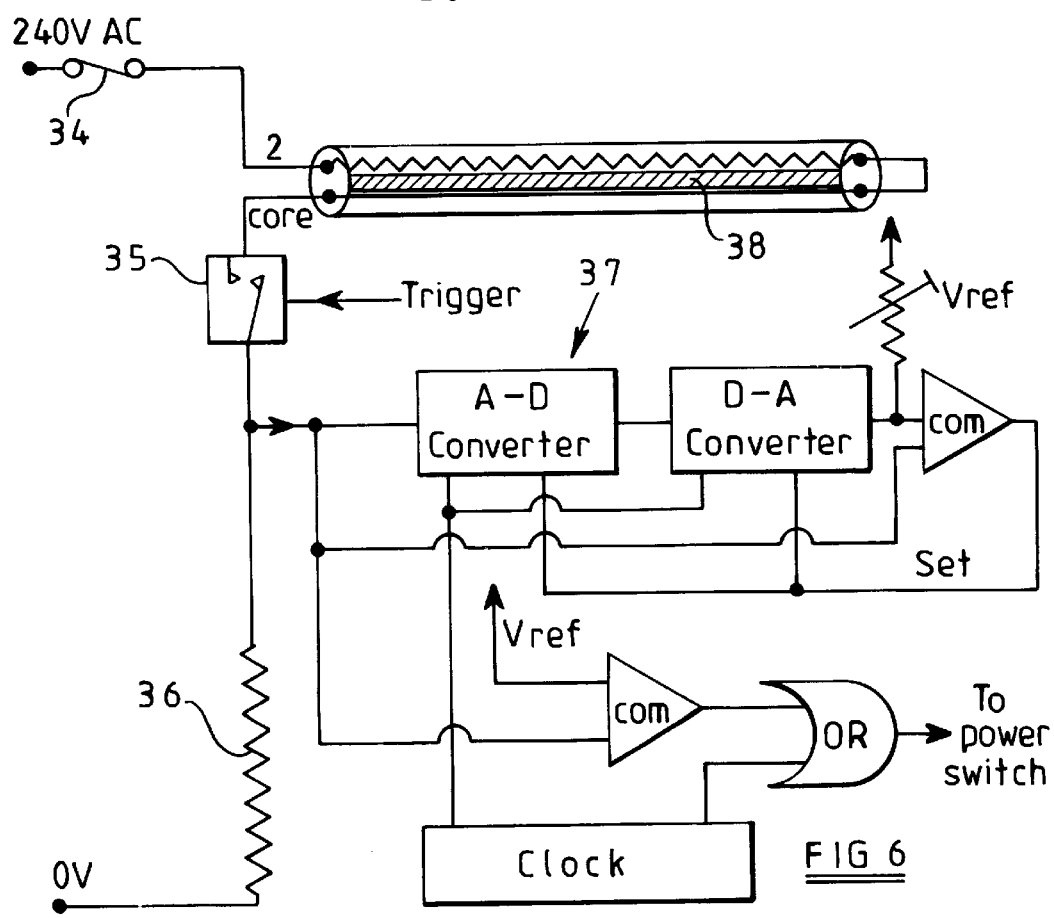
FIG. 6 is a diagram of one form of electronic control circuit for controlling the heating element in any of the arrangements of FIGS. 1 to 5.

One form of electronic control switch circuitry suitable for controlling the heating element in the arrangements of FIG. 1 or FIG. 5 is shown diagrammatically in FIG. 6. The control assembly comprises a fuse 34, an electronic switch 35, a low value current monitoring resistor 36 and electronic control circuitry shown diagrammatically at 37.

In the electric blanket or personal heating pad the resistance of the heating element (shown diagrammatically at 38 in FIG. 6) changes with temperature and the electronic circuitry 37 is arranged to sense the change of resistance and control the temperature of the element in response to the change in resistance, so as to keep the temperature at a preset value. The control switch may provide for up to three discrete temperature settings, or may provide variable control.

The circuitry 37 incorporates an SCR or triac to control the power supply to the conductors. If a short circuit occurs, the current through the sensing resistor 36 increases. Since the electronic circuitry sees an increasing current as a reduction in the temperature of the heating element, it automatically commands the SCR or triac to turn on for longer, thus providing adequate time for the fuse 34 to blow.

Since it is desirable for a heating pad for personal use to have a fast warm-up time, the circuitry 37 provides a rate of temperature rise of the heating element which is independent of the temperature setting of the circuitry and provides a temperature rise of 100° C. in about five minutes.

Figure 7:
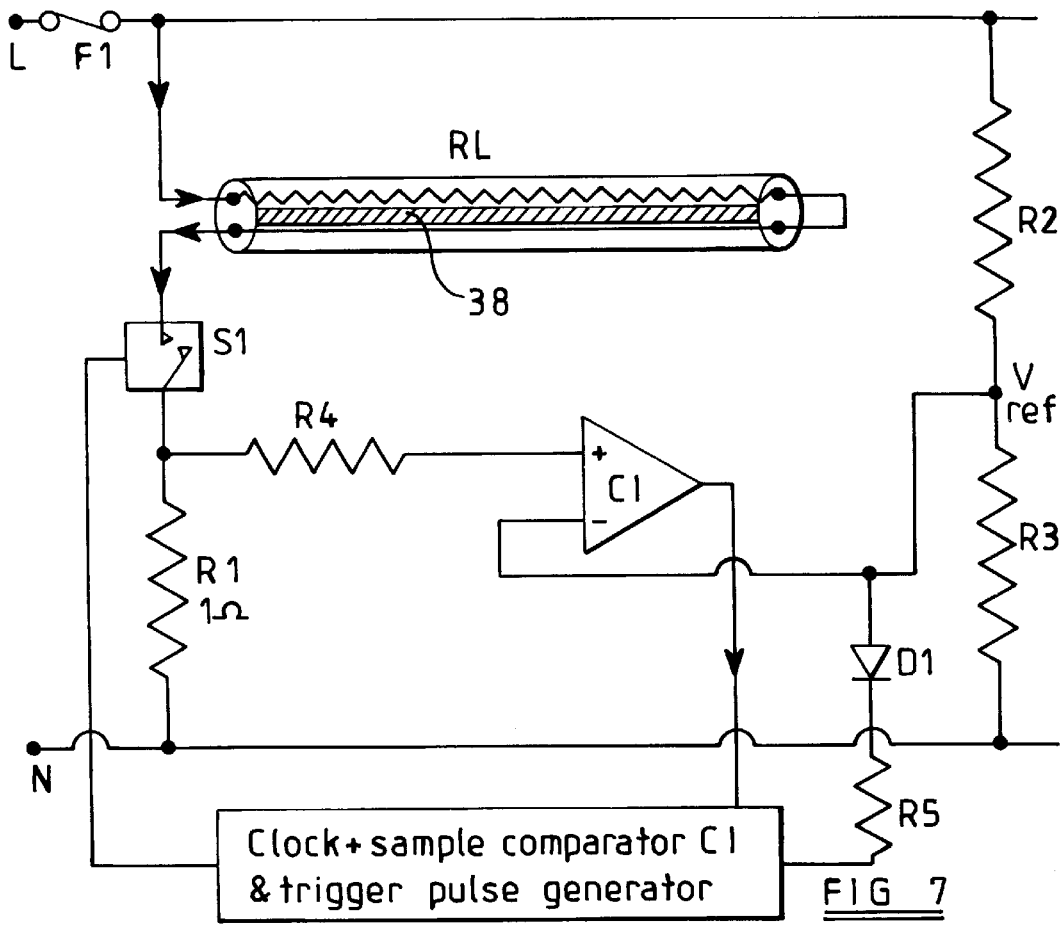
FIG. 7 is a diagram of an alternative and preferred form of electronic control circuit.

FIG. 7 shows a modified and preferred version of the electronic control circuitry shown in FIG. 6. Reference L indicates the line terminal of an a.c. electric mains supply, and N indicates the neutral terminal of the supply.

The resistance $R_L$ of the heating element 38 at a temperature of T° C. is given by:

$$R_L R_O(1+\alpha T)$$

where:
$R_O$=resistance at 0° C.
α=resistivity coefficient of the heating element
Since $R_L$ at ambient temperature, say 20° C.=$E^2/W$
where:
E=supply volts
W=normal wattage
it is possible to calculate $R_O$.

For the purpose of automatic temperature control, the current through the electronic switch S1, and through the load resistance $R_L$ of the heating element 38, is monitored by resistor R1 (typically 1 ohm). The voltage across the resistor R1 is compared with a reference voltage $V_{ref}$ derived from the mains supply via resistors R2 and R3. When the heating element is at the desired pre-set temperature the voltage across the resistor R1 is equal to $V_{ref}$.

The values of R2 and R3 are chosen so that:

$$V_{supply} \cdot \frac{R3}{R2+R3} = V_{ref} = V_{supply} \cdot \frac{R1}{R1 \cdot \text{hot value of } R_L}$$

It should be noted that the temperature setting is independent of the supply voltage. Accordingly, when the voltage across R1 falls below the value of $V_{ref}$, the comparator C1 switches and turns off the electronic switch S1. The heating element now cools down and its resistance $R_1$, decreases. At regular intervals, as determined by a clock, the electronic switch S1 is turned on again for a short period, during which the output from the comparator C1 is sampled. If $R_L$ has decreased sufficiently (i.e. the element has cooled down) so as to make the voltage across R1 greater than the reference voltage $V_{ref}$, then the comparator C1 goes low, enabling the trigger pulse circuitry, so keeping the electronic switch S1 on until the value of the voltage across R1 has fallen to $V_{ref}$ again.

In order to provide rapid warm-up of the heating element, the reference voltage, determined by R2 and R3, can be lowered for the first few minutes of operation (say 5–10 minutes) by grounding one end of resistor R5, thus effectively reducing the value of R3. This means that the heating element now has to get even hotter before the voltage across R1 has fallen to the value determined by R2 and the R3/R5 parallel combination.

At the end of this rapid warm-up period, the clock goes high reverse, biasing the diode D1 in series with the resistor R5. The reference voltage, in turn, then reverts back to the value set by R2 and R3 only. The element thus cools down and starts to control again only when the voltage across R1 has increased to the new value of reference voltage.

Figure 8:
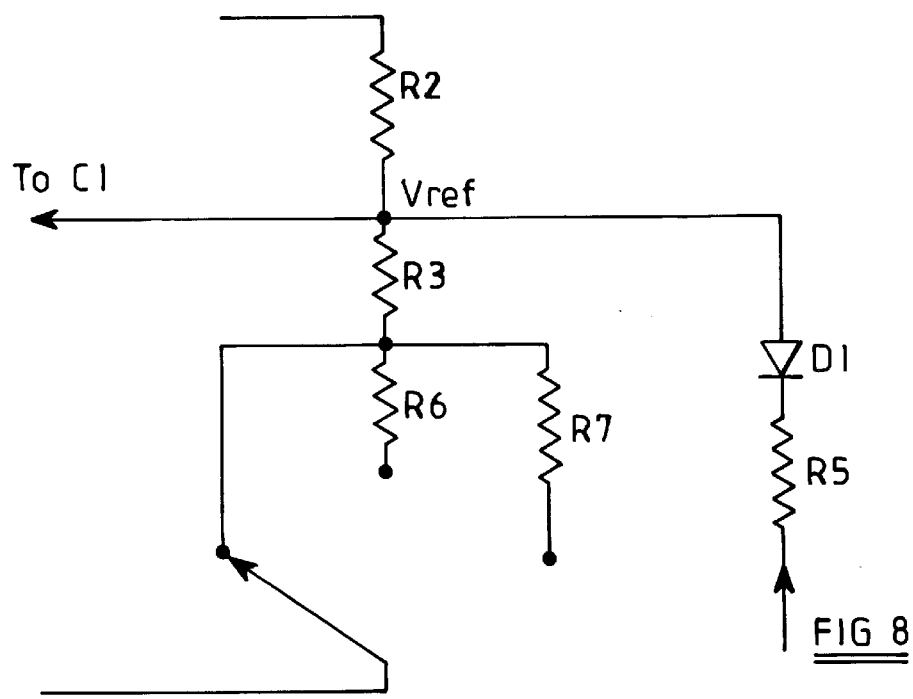
FIG. 8 shows a modification of the circuit of FIG. 7.

Manual temperature control of the heating element may also be incorporated. This can be achieved by permitting the effective value of R3 to be increased manually, either continuously or in discrete steps, to provide lower heat settings. Such an arrangement is shown in FIG. 8, which is a modification of part of the circuit of FIG. 7.

As before, if the value of the heating element resistance $R_L$ at the desired control temperature is known, then $$\frac{R1}{R1+R_L \text{ at temp. setting required}} = \frac{R3+R6}{R2+R3+R6} = \frac{R3+R7}{R2+R3+R7}$$

In practice the values of R3, R5, R6 and R7 might be chosen so as to give;

R5 in circuit (warm-up period only); element temperature=100° C.
R5 out of circuit (after warm-up): element temperature=80° C. (High setting)
R6 in circuit: element temperature=60° C. (Medium setting)
R7 in circuit: element temperature=45° C. (Low setting)

As has been indicated, the values of the temperature setting resistor are independent of the mains supply voltage.

Similarly, other features such as automatic compensation for element resistance tolerances can be added by adjusting the reference voltage by an amount proportional to the ± tolerance variation in the initial, i.e. cold, value of element resistance.

I claim:

1. Heating apparatus comprising a flexible heating panel and electrical components providing an electric circuit for heating the panel, the electrical components including an electrical heating element mounted directly on the panel, said heating element comprising inner and outer coaxial conductors electrically connected together at one end thereof, the coaxial conductors being separated by an inner electrically insulating layer therebetween and surrounded by an outer electrically insulating layer disposed on said panel, said inner insulating layer between the conductors having a melting point which is at least 40–60° C. lower than the melting point of the outer insulating layer surrounding the outer conductor, an electric cable for connecting the heating element to a power supply, an electric control switch for controlling operation of the heating element, and a fuse device located to be actuated in the event of a short circuit occurring between the conductors of the heating element resulting from breakdown of any part of said inner insulating layer, said heating element being the only component of said electric circuit which is mounted directly on the flexible heating panel, and said cable for connecting the heating element to a power supply comprising a flexible two-core electrical cable connecting the heating element to the other components of the electric circuit.

2. Heating apparatus according to claim 1, wherein the electric circuit includes a separable two-pin plug and socket connector located in the two-core flexible cable adjacent the heating panel.

3. Heating apparatus according to claim 1, wherein both ends of the heating element are located adjacent one side edge of the heating panel, and a portion of the heating element intermediate the ends thereof is located adjacent the opposite side edge of the heating panel.

4. Heating apparatus according to claim 3, wherein stretches of the heating element along one half of the length thereof lie generally alongside stretches of the element along the other half thereof.

5. Heating apparatus according to claim 4, wherein the heating element is mounted on the heating panel in a tortuous configuration, each stretch of the element which is nearer one end of the element lying alongside another stretch which is substantially the same distance from the opposite end of the element.

6. Heating apparatus according to claim 4, wherein the distance between adjacent stretches of the heating element is generally in the range of 12–15 mm.

7. Heating apparatus according to claim 1, wherein a first minor stretch of the heating element, extending away from the end thereof which is connected to the two-core flexible cable, extends across a region of the heating panel adjacent connection of the element to the two-core cable, across a region of the panel furthest from the connection to the two-core cable, and across a region of the panel intermediate the first said two regions.

8. Heating apparatus according to claim 1, wherein the electric circuit, when connected to an alternating current power supply, allows full wave alternating current to flow through the heating element.

9. Heating apparatus according to claim 1, wherein the electric circuit includes control means to permit variation in the current flowing through the heating element.

10. Heating apparatus according to claim 9, wherein said control means includes a rectifier diode and switch means selectable to bring the diode into and out of circuit with the heating element.

11. Heating apparatus according to claim 9, wherein said control means comprises a mechanical or electronic voltage regulator.

12. Heating apparatus according to claim 1, wherein the electric circuit includes means to sense the change of resistance of the heating element with change in temperature and to control the temperature of the element in response to the change in resistance to keep the temperature at a pre-set value.

13. Heating apparatus according to claim 12, wherein said means to sense the change of resistance of the heating element comprises a current monitoring resistance connected to the heating element so that increase in temperature, and hence resistance, of the heating element, results in a decrease in current flowing through the monitoring resistance, the circuit further including means to reduce the current supplied to the heating element in response to a fall in the current flowing through the monitoring resistance, and to increase the current supplied to the heating element in response to a rise in the current flowing through the monitoring resistance.

14. Heating apparatus according to claim 13, wherein the electric circuit includes further resistors connected across the power supply to provide a reference voltage so that the voltage across the monitoring resistance is equal to the reference voltage at a desired temperature of the heating element, means being provided to vary the reference voltage selectively, so as to vary the desired temperature.

15. Heating apparatus according to claim 14, wherein the means to vary the reference voltage comprises means for selectively connecting one or more setting resistors in series with one of said resistors determining the reference voltage.

16. Heating apparatus according to claim 15, wherein the electric circuit includes clock means for automatically connecting one of said setting resistors in series with said one of the reference voltage determining resistors for a predetermined period when the heating element is first connected to the power supply, in order to provide a rapid warm-up period.

17. Heating apparatus according to claim 1, wherein the melting point of the inner insulating layer between the conductors is in the range of about 135–145° C.

18. Heating apparatus according to claim 1, wherein the fuse device is a slow blow fuse.

* * * * *